(12) United States Patent
Carlson (10) Patent No.: US 9,322,501 B2
(45) Date of Patent: Apr. 26, 2016

(54) FLEXIBLE TUBING WITH EMBEDDED HELICAL CONDUCTORS AND METHOD OF MAKING

(75) Inventor: Eric Carlson, Laguna Hills, CA (US)

(73) Assignee: STEWARD PLASTICS, INC., Laguna Hills, CA (US)

( * ) Notice: Subject to any disclaimer, the term of this patent is extended or adjusted under 35 U.S.C. 154(b) by 267 days.

(21) Appl. No.: 13/261,738

(22) PCT Filed: Sep. 24, 2011

(86) PCT No.: PCT/US2011/001642
§ 371 (c)(1),
(2), (4) Date: Sep. 20, 2013

(87) PCT Pub. No.: WO2012/128736
PCT Pub. Date: Sep. 27, 2012

(65) Prior Publication Data
US 2014/0037276 A1     Feb. 6, 2014

Related U.S. Application Data

(63) Continuation-in-part of application No. 13/066,972, filed on Apr. 30, 2011, now Pat. No. 8,563,864, which is a continuation-in-part of application No. 11/903,898, filed on Sep. 25, 2007, now Pat. No. 7,965,930, application No. 13/261,738, which is a continuation-in-part of application No. 13/066,374, filed on Apr. 13, 2011, now Pat. No. 8,563,863, which is a continuation-in-part of application No. 11/903,898, application No. 13/261,738, filed on Sep. 20, 2013, which is a continuation-in-part of application No. 13/065,563, filed on Mar. 24, 2011, now abandoned, which is a continuation-in-part of application No. 11/903,898.

(51) Int. Cl.
| | |
|---|---|
| E03B 7/10 | (2006.01) |
| F24H 1/10 | (2006.01) |
| F16L 53/00 | (2006.01) |
| F16L 11/118 | (2006.01) |
| F16L 11/16 | (2006.01) |
| H05B 3/02 | (2006.01) |
| F16L 11/127 | (2006.01) |
| B29C 53/78 | (2006.01) |

(52) U.S. Cl.
CPC ............. *F16L 53/004* (2013.01); *B29C 53/785* (2013.01); *F16L 11/1185* (2013.01); *F16L 11/127* (2013.01); *F16L 11/16* (2013.01); *H05B 3/02* (2013.01); *Y10T 29/49083* (2015.01)

(58) Field of Classification Search
None
See application file for complete search history.

(56) References Cited

U.S. PATENT DOCUMENTS

| | | | | |
|---|---|---|---|---|
| 4,693,324 | A * | 9/1987 | Choiniere et al. | 174/47 |
| 5,715,870 | A * | 2/1998 | Winter et al. | 138/121 |
| 5,848,223 | A * | 12/1998 | Carlson | 392/478 |
| 6,103,971 | A * | 8/2000 | Sato et al. | 174/47 |
| 6,248,954 | B1 * | 6/2001 | Clark et al. | 174/113 R |
| 6,367,510 | B1 * | 4/2002 | Carlson | 138/121 |

(Continued)

*Primary Examiner* — Thor Campbell (57) ABSTRACT

A smooth-bore plastic tubing with an outer helical support bead is resistant to collapse and incorporates plural conductors disposed outside of the tubing bore and insulated both from ambient and from one another within the sidewall of the tubing. The conductors may have a desired relatively high thermal conductivity to tidal air flow within the tubing, while also having a comparatively high thermal resistance relative to ambient. The conductors may be electrical conductors, or fiber optic conductors.

28 Claims, 5 Drawing Sheets

(56) References Cited

U.S. PATENT DOCUMENTS

| | | | |
|---|---|---|---|
| 6,537,405 B1 * | 3/2003 | Henderson et al. | 156/195 |
| 7,156,127 B2 * | 1/2007 | Moulton et al. | 138/122 |
| 2003/0183294 A1 * | 10/2003 | Carlson | 138/129 |
| 2005/0034891 A1 * | 2/2005 | Ekeberg et al. | 174/113 R |
| 2009/0078440 A1 * | 3/2009 | Carlson et al. | 174/47 |

* cited by examiner

FLEXIBLE TUBING WITH EMBEDDED HELICAL CONDUCTORS AND METHOD OF MAKING

BACKGROUND OF THE INVENTION

1. Field of the Invention

The present invention relates generally to collapse-resistant, flexible thermoplastic tubing, to such plastic tubing which includes plural helical conductors extending along the length of the tubing and imbedded within the sidewall, of the tubing, and to a methods for making such flexible plastic tubing.

2. Description of Conventional Technology

Tubing having a relatively thin wall and an integral helical supporting bead is known in the art. Such support-bead tubing construction provides substantial crush resistance while leaving the tube wall flexible enough to permit short-radius bends without collapsing or kinking the tube. The versatility of this kind of tubing is evidenced by its wide applicability in construction, ventilation, manufacturing processes, auto washes, hospitals, medical devices, and other fields. In medical applications the necessity to maintain a clean environment dictates that the tubing be free of crevices both inside and outside because soil or bacterial contamination could reside in such crevices were they present. A smooth inner bore for the tubing is also important because flow resistance must be kept to a minimum when a tidal air flow is conducted through the tubing, as is the case with inhalation therapy, CPAP (Continuous Positive Airway Pressure) and other breathing-assistance machines.

U.S. Pat. No. 3,910,808 to Steward, assigned to the same assignee as this application, discloses apparatus for forming such thin-walled, flexible, crush resistant support-bead tubing. Steward discloses means for extruding a plastic strip having a longitudinal rib, and winding means for helically winding the strip about an axis to produce a corrugated flexible tubing having a smooth bore.

Further, U.S. Pat. No. 5,454,061, also to Steward, discloses apparatus for forming such thin-walled, flexible, crush resistant support-bead tubing also including a helically disposed conductor. Steward '061 discloses a tubing in which the conductor is disposed adjacent to overlapping side edges of an extruded plastic strip or ribbon, which is wrapped helically on itself while molten to form the tubing wall. The overlapped edges of the ribbon as well as the conductor are then, helically covered with an extruded molten bead, which also bonds with and becomes an integral part of the tubing.

With the Steward '061 tubing, and with other conventional tubing, when plural conductors are disposed in the tubing wall, they are immediately adjacent to one another. In some applications when the conductors are used for warming, heating, or maintaining the temperature of a tidal air flow in the tubing by means of resistance heating, for example, the heating from these conductors is concentrated at their location. It may be desirable for the conductors not to be immediately adjacent to one another so that heating is somewhat more dispersed. Further, when plural conductors are disposed in such a tubing wall, and one or more of the conductors is utilized for conducting instrumentation or telemetry signals, then it is also desirable for the conductors to be spaced apart a controlled and determined distance for purposes of preserving signal clarity and fidelity, for insuring electrical insulation between the conductors, and for preventing or reducing mutual inductive coupling among the conductors, including the heating conductors and the signal conductors.

No prior product, method of manufacture, or apparatus is known which provides a thin-walled, smooth-bore tube having plural spaced apart conductors helically imbedded at two radial levels in the outer structure of the tube and which conductors are available for heating of tidal air flow in the tube, as well as for instrumentation or telemetry signals to be conducted along the length of the tube, for example, all with a helically ribbed but substantially crevice-free outer surface.

Those ordinarily skilled in the pertinent arts and familiar with U.S. Pat. No. 3,910,808 to Steward will understand that tubing of the type described in this application is generally manufactured using an apparatus including a winding or wrapping head having plural (usually 4) cantilevered and rotationally driven winding rolls. These winding rolls are canted both axially and radially, and are spaced about a longitudinal axis for winding and rotationally advancing a helically wound and ribbed flexible tubing. The winding rolls rotate in unison while a molten plastic ribbon is helically wrapped on itself and integrally heat bonds to form a spinning and axially advancing tubing wall. The tubing is cooled internally and externally by air or water, or a combination, delivered and directed onto the forming tubing so as to allow the molten plastic ribbon and other parts to fuse, and to accomplish solidification and cooling of the plastic. While the tubing is being formed, conductors are placed on the tubing wall, and an outer molten bead is wrapped helically along the tubing wall atop of the conductors. The bead integrally heat bonds to become a part of the tubing wall. The tubing is cooled finally in an immersion water bath, and is then cut into determined lengths.

SUMMARY OF THE INVENTION

In view of the deficiencies of the related art as discussed above, it is a primary object of the present invention to provide a flexible, lightweight, crush-resistant tubing having plural spaced apart conductors, and a conductor-supporting bead, helically wound about and integral with the wall of the tubing.

It is another object of this invention to provide such a tubing in which the wall of the tubing provides an elevated helical plateau, in which plural helical grooves or crevices are defined, and into which the plural conductors are disposed and spaced uniformly and helically about and along the length of the tubing, to there be integrally covered by a support bead.

Still another object for this invention is to provide a tubing as described immediately above, and in which the support bead itself includes a radially inner portion which outwardly defines at least one helical groove or crevice into which at least one additional conductor is received. An upper or cap portion of the support bead retains and protects the additional conductor.

These and other objects are achieved by the present invention which provides: a thin-walled, flexible and collapse-resistant thermo-plastic tubing having a substantially smooth bore and a helical outer support bead structure, the tubing including plural conductors helically disposed within the support bead structure, the tubing comprising: a flexible tubing wall formed of an elongate primary thermoplastic ribbon including a comparatively thinner wall portion and a comparatively thicker bead-foundation plateau portion, the plateau portion defining plural elongate fine-dimension grooves, the primary ribbon while molten being helically wrapped repeatedly on itself to overlap successive wraps of the primary ribbon a certain amount forming a helical lap joint whereat successive wraps of the primary ribbon heat-bond integrally to one another so that an elongate tubing body is formed; plural elongate conductors each disposed individually in a respective one of the fine-dimension grooves of the plateau portion and helically around and along the elongate tubular body; a secondary elongate thermoplastic ribbon while molten being helically wrapped repeatedly on the plateau portion of the primary ribbon and heat-bonding integrally thereto to capture the plural elongate conductors; at least one additional conductor helically wrapped onto the secondary ribbon to dispose at a radially outer location relative to the plural conductors; and an elongate thermoplastic support bead portion disposed helically around and along the elongate tubular body atop of the plateau portion and the secondary ribbon while molten, the support bead portion integrally heat-bonding to the secondary ribbon so that the plateau portion, the secondary ribbon, and the support bead portion cooperatively form the bead structure, and the tubing comprises a unitary thin-walled tubing structure with helical outer support bead and embedded conductors extending helically about and along the tubing.

For resistance heating purposes, the wire conductor is preferably formed of copper, although resistive metal such as nickel-chromium may also be utilized. For telemetry purposes, the conductor(s) may be any suitable conductive material, including metals and conductive polymers, for example. A conductor which conducts light may also be employed (i.e., a fiber-optic conductor). Further, one or more of the conductors may comprise a twisted-pair of electrical conductors, which provides unique properties in terms of inductive and capacitive coupling among the conductors.

Further applications of the present invention will be apparent to those skilled in the art from a consideration of a fully detailed exemplary embodiment thereof. To aid in the explanation of the exemplary embodiment, reference will be made to the figures of the appended sheets of drawings, which figures will first be described briefly.

BRIEF DESCRIPTION OF THE DRAWING FIGURES

The advantages and features of the present invention will be better understood by the following description when considered in conjunction with the accompanying drawings in which.

DETAILED DESCRIPTION OF EXEMPLARY PREFERRED EMBODIMENTS OF THE INVENTION

Figure 1:
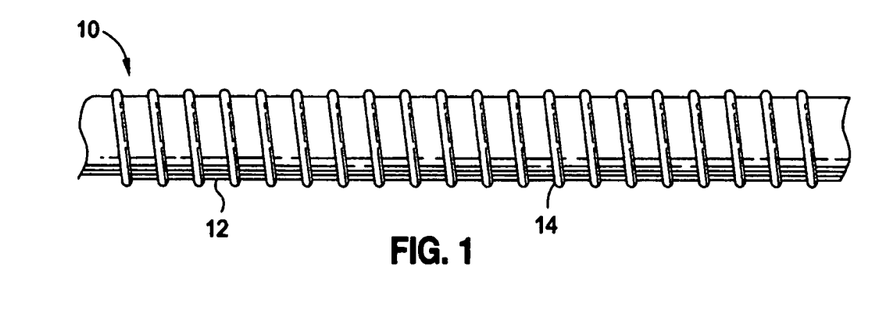
FIG. 1 provides an exterior view of a tubing according to this invention.

Considering now FIGS. 1-6 in conjunction with one another, and viewing first FIG. 1, it is seen that the tubing 10 according to this invention has an exterior appearance essentially the same as conventional tubing of this type. That is, the tubing has a comparatively thin and flexible wall 12, and a helical bead 14 protruding somewhat above this wall and extending helically about and along the length of the tubing. As will be seen, the tubing 10 also includes embedded conductors (not seen in FIG. 1) extending helically in the bead 14 and along the length of tubing 10 from end to end.

Figure 2:
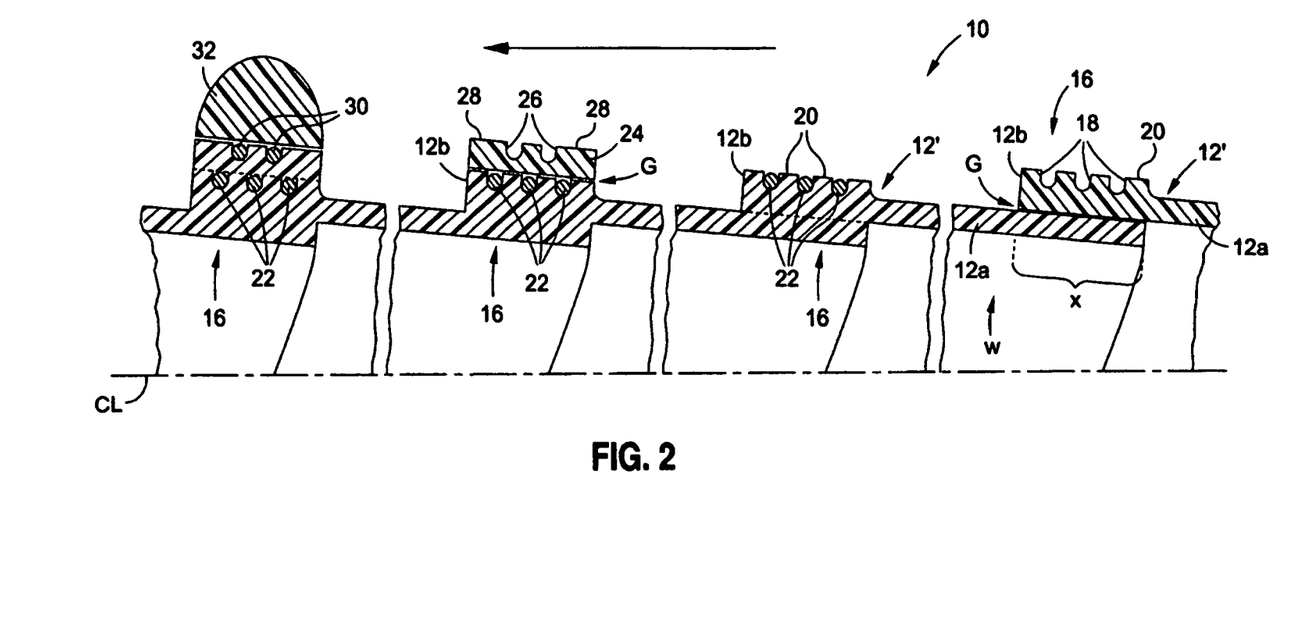
FIG. 2 is a fragmentary cross sectional view of the tubing seen in FIG. 1.
Figure 3:
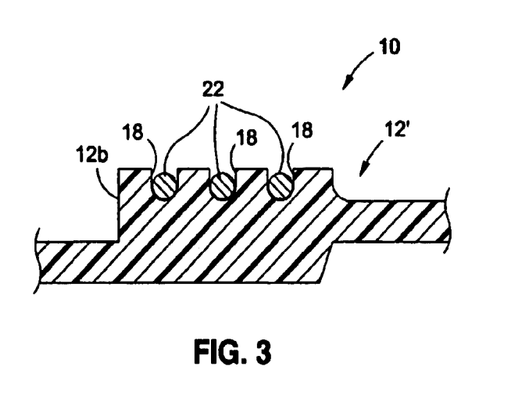
FIG. 3 provides a fragmentary cross sectional view of an, elongate section of the wall of the tubing seen in FIGS. 1 and 2 during manufacture.
Figure 4:
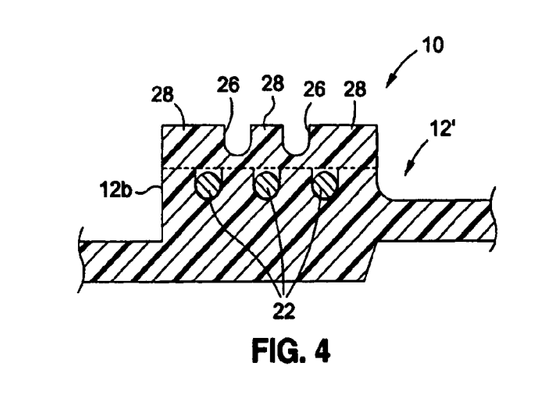
FIG. 4 provides a fragmentary cross sectional view of an elongate section of the wall of the tubing seen in FIGS. 1-3, at a next-subsequent step of manufacture.

Viewing now FIG. 2, which illustrates both structures as well as steps in the process of making the present inventive tubing, it is seen that the wall 12 is formed by successive helical wraps of an elongate thin thermoplastic primary ribbon 12'. This thermoplastic primary ribbon 12' is initially in molten condition, having just been discharged from the die of a plastic extrusion machine (not seen in the drawing Figures). At the right-hand side of FIG. 2, the most recently extruded portion of primary ribbon 12' is about to touch down (note the slight gap "G") on a previously extruded portion of primary ribbon 12' which is wrapped about spinning winding rolls (also not seen in the drawing Figures). Thus, the tubing structure forming in FIG. 2 is spinning about its centerline, indicated at "CL."

The primary ribbon 12' includes a rather thin and flexible portion 12a extending axially between adjacent beads 14 along the length of the tubing 10, as seen in FIG. 1. This thin portion 12a forms the wall 12 seen in FIG. 1. Primary ribbon 12' also includes a somewhat thickened plateau portion 12b which is disposed beneath the bead 14 seen in FIG. 1. That is, the plateau portion 12b is an integral portion of the primary ribbon 12', and protrudes radially outwardly relative to the thinner portion 12a to form a base or foundation upon which the bead 14 is built up and secures.

As is seen best at the right hand end of FIG. 2, just before the moment a successive wrap of the primary ribbon 12' touches a preceding wrap (again, note the slight gap "G"), the wraps of primary ribbon 12' are distinct from one another in axial cross section (but are integral with one another helically along the length of the ribbon 12'—that is, around the winding rolls), and the successive wraps of primary ribbon 12' as they touch and interbond form a wrap or overlap joint (note the overlap dimension X, indicated on FIG. 2), as is generally indicated with arrowed numeral 16.

In other words, as the wraps of primary ribbon 12' touch they heat bond together, and as is seen at the next lap joint 16 to the left in FIG. 2, the successive wraps of ribbon 12' have touched at joint 16 and heat bonded to one another (i.e., the ribbon is molten thermoplastic at this time), and the wraps of primary ribbon 12' are now integral with one another, both helically and axially along the length of the tubing 10. It is for this reason that the cross hatching of FIG. 2 shows the tubing structure 10 becoming an integral whole. The joint lines at what was once individual parts or successive wraps of the primary ribbon 12' may be indicated in the various drawing Figures with dashed lines as on FIG. 2 simply as a reminder to the reader, but the structure of the plastic tubing 10 is becoming a unity in FIG. 2. Again, it will be recalled that the tubing 10 during manufacture is both spinning about its axis (i.e., about centerline "CL"), and as it is formed is moving leftwardly relative to the viewer of FIG. 2, as is indicated by the left-facing arrow on FIG. 2. Also, the inner surface of the wraps of primary ribbon 12' (i.e., disposed toward the centerline indicated on FIG. 2) is being actively cooled by a water spray, indicated on FIG. 2 by the arrow "W". Moreover, the change in status of the successive wraps of ribbon 12' denoting the formation of a integral tubular body is indicated on FIG. 2 by the successive changes from distinct cross hatches, to an integral or uniform cross hatch both for the successive wraps of ribbon 12' and other parts of the tubing 10.

At the plateau portion 12b the primary ribbon 12' (and tubing 10) includes plural spaced apart grooves 18 each bounded by a respective rib part 20 of the plateau portion 12b. Disposed within these grooves 18 and separated from one another by the ribs 20 are individual conductors 22 (viewing FIGS. 2 and 3). As will be seen below, the conductors 22 need not be individually disposed in the tubing 10, but may be disposed as a twisted pair, for example, advantages of which are explained more fully below. But, the embodiment of FIGS. 1-6 utilizes individual conductors disposed in the tubing 10 beneath bead 14, and running in parallel helically about and from end to end of a length of the tubing 10. It will be understood that the conductors 22 are wrapped into the grooves 18 as the progressively forming tubing 10 spins on the wrapping rolls described earlier.

Next, a thin, elongate, fine-dimension, secondary ribbon 24 is extruded (i.e., as molten plastic) and is placed on top of the plateau 12b. This secondary ribbon is first seen at the third lap joint. 16 to the left in FIG. 2, in a position just before alighting on the plateau 12b (again, note the slight gap "G"). A moment later in the manufacturing process as illustrated in FIG. 2, the secondary ribbon 24 will have touched upon the top of plateau 12b, and heat bonded into unity with the parts of the tubing 10 formed to the illustrated moment. The secondary ribbon 24 (and tubing 10) includes plural spaced apart grooves 26 each bounded by a respective rib part 28 of the secondary ribbon 24. As is seen in FIG. 2 at the next lap joint location 16 to the left (i.e., near the left margin of FIG. 2), disposed within these grooves 26 of the secondary ribbon 24 and separated from one another by the ribs 28 are individual conductors 30 (viewing FIGS. 2 and 5). Conductors 30 may be electrical conductors, or optical conductors, or a combination thereof. It will be understood that the conductors 30 are also wrapped into the grooves 26 as the progressively forming tubing 10 spins, which spinning is caused by the wrapping rolls described earlier.

Figure 5:
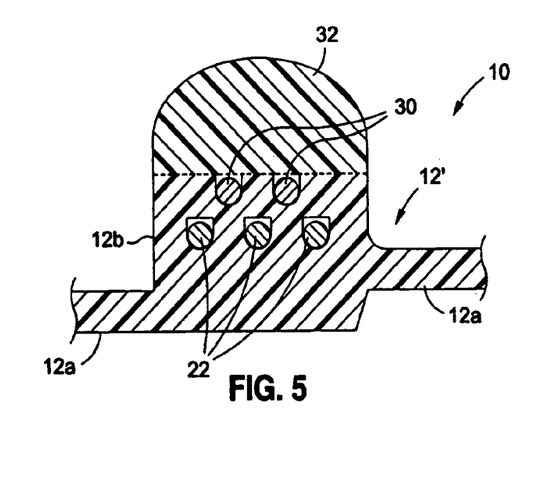
FIG. 5 provides a fragmentary cross sectional view of an elongate section of the wall of the tubing seen in FIGS. 1-4, at a next-subsequent step of manufacture.
Figure 6:
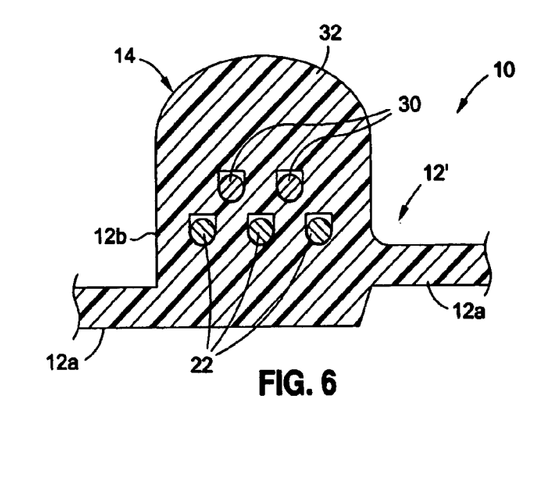
FIG. 6 is a fragmentary cross sectional view of an elongate section of the wall of the tubing seen in FIGS. 1-5, with manufacture of the tubing completed.

FIG. 2 also shows that very shortly after the placement of the conductors 30 within grooves 26 of the secondary ribbon 24, a bead portion 32 is extruded (i.e., molten plastic) and is disposed on top of the secondary ribbon 24 and conductors 30. The moment of touch down of the bead portion 32 atop of the secondary ribbon 24 is depicted in FIG. 5. As FIG. 5 shows, this bead portion 32 in combination with the plateau portion 12b of primary ribbon 12', and the fine-dimension secondary ribbon 24, defines the rib 14 seen on the outside of tubing 10 in FIG. 1. FIG. 6 illustrates that the plastic components of the tubing 10 heat bond with one another into an integral unitary whole, including therein the conductors 22 and 30.

Figure 7:
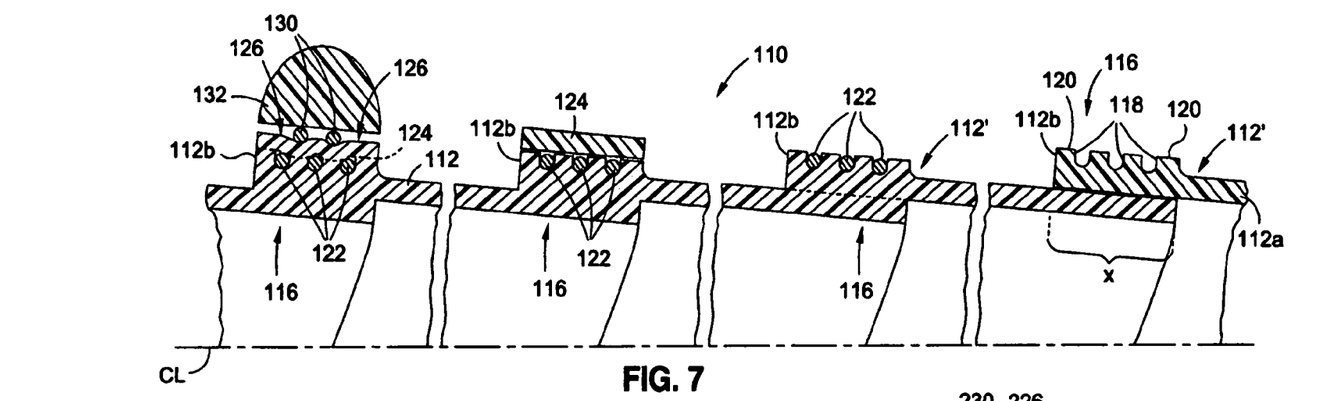
FIGS. 7 and 8 provide a fragmentary cross sectional views of an elongate section of an alternative embodiment of tubing, and are similar to that of FIGS. 2 and 6, respectively, with the exception that this alternative embodiment of tubing is realized by a manufacturing process which is presently believed by the applicant to offer advantages in simplicity and cost reduction.
Figure 8:
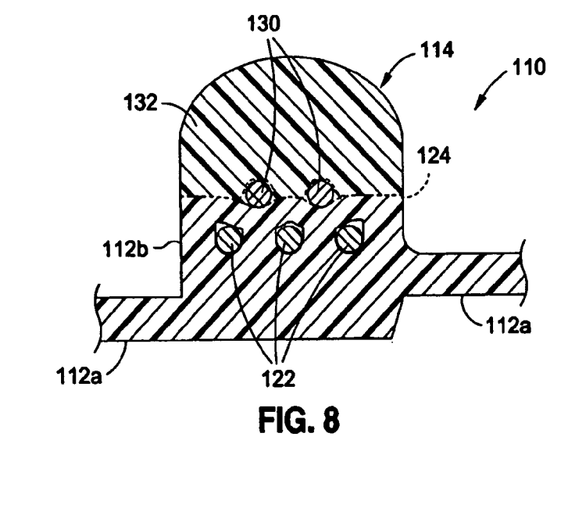

Considering now FIGS. 7 and 8 in conjunction with one another, and viewing first FIG. 7, it is seen that the making of an alternative embodiment of tubing 110 is depicted. Because this alternative embodiment of tubing 110 includes many features that are the same as, or which are analogous in structure or function to, those of the first embodiment of FIGS. 1-6, these features are referenced by the same numeral used above, and increased by one-hundred (100). The tubing 110 has an exterior appearance essentially the same as conventional tubing of this type, and the same as the tubing 10 of FIGS. 1-6. That is, the tubing 110 has a comparatively thin and flexible wall 112, and a helical bead 114 protruding somewhat above this wall and extending helically about and along the length of the tubing. The tubing 110 also includes embedded conductors extending helically in the bead 114 and along the length of tubing 110 from end to end, as will be further explained.

Viewing now FIG. 7, (which much like FIG. 2) illustrates both structures as well as steps in the process of making an inventive tubing 110, it is seen that the wall 112 is formed by successive helical wraps of an elongate thin thermoplastic primary ribbon 112'. Primary ribbon 112' also includes a thin wall portion 112a, and a plateau portion 112b defining plural spaced apart grooves 118 each bounded by a respective rib part 120 of the plateau portion 112b. Disposed within these grooves 118 and separated from one another by the ribs 120 are individual conductors 122. A thin, elongate, secondary ribbon 124 is placed on top of the plateau 112b, and interbonds with this plateau 112b.

This secondary ribbon 124, in contrast to the ribbon 24 of the first embodiment, is substantially flat at the time it is extruded, does not define elongate grooves, but is conformal to the shape of the plateau 112b upon which it is placed (including the conductors 122) as is more fully explained below. More particularly, the secondary ribbon 124 is conformal to the stiffness or resistance to deformation of the plateau 112b. Accordingly, considering that the plastic material forming the tubing 110 is at this time yet molten to a degree, the conductors 122 form or define "hard" spots in the forming tubing structure. And, in contrast, the molten plastic material adjacent to the conductors 122 forms "softer" or compliant structure. As a result, the secondary ribbon 124 which is molten and under tension as it winds about the forming tubing structure, tends to pull inwardly between the spaced apart conductors 122, and to remain piled up over these conductors 122. Thus, although the secondary ribbon 124 is not extruded with grooves on its top (i.e., radially outward) surface as was the case with the secondary ribbon in the first embodiment, once the secondary ribbon 124 is pulled into place atop of the plateau 112b, as is seen in FIG. 7, it forms a pair of spaced apart elongate helical recesses (indicated with the arrowed numerals 126) in its upper (i.e., radially outer) surface. These recesses 126 have the effect of guiding the conductors to be placed on the secondary ribbon 124, much as did the grooves 26 of the first embodiment.

Disposed within the recesses 126 of the secondary ribbon 124 are a pair of individual conductors 130 (viewing FIGS. 7 and 8). It will be understood that the conductors 130 are also wrapped into the recesses 126 as the progressively forming tubing 110 spins, which spinning is caused by the wrapping rolls described earlier. FIG. 7 also shows that very shortly after the placement of the conductors 130 within recesses 126 of the secondary ribbon 124, a bead portion 132 is extruded (i.e., molten plastic) and is disposed on top of the secondary ribbon 124 and conductors 130. As is by now well understood, the plastic components of the tubing 110 heat bond, and form a unitary integral structure, which is tubing 110.

Figure 9:
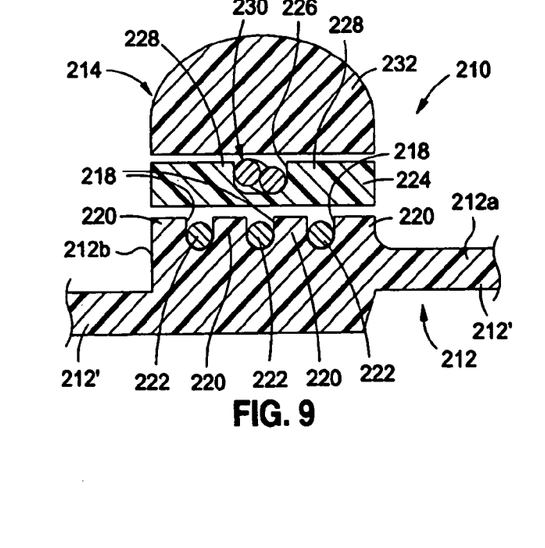
FIG. 9 provides a fragmentary cross sectional view of a section of yet another alternative embodiment of tubing, and is similar to FIGS. 2 and 7, with the exception that the steps of manufacture of this alternative embodiment of tubing are shown in a condensed version of the drawing Figure, and this alternative tubing embodiment includes a twisted pair of electrical conductors disposed at a radially outer level within a bead structure of the tubing.

Turning now to a consideration of FIG. 9 it is seen that the making of yet another alternative embodiment of tubing 210 is depicted. Because this alternative embodiment of tubing 210 also includes features that are the same as, or which are analogous in structure or function to, those of the first and second embodiments of FIGS. 1-6, and of FIGS. 7 and 8, these features are referenced by the same numeral used above, and increased by two-hundred (200). The tubing 210 has an exterior appearance essentially the same as conventional tubing of this type, and the same as the tubing 10 and 110 of the Figures discussed and described above. The making of the tubing 210 of FIG. 9 is depicted as a sequence of "layers" much as that presented in FIGS. 2 and 7, but with the manufacturing process already well understood by the reader so that just the layering together of extruded plastic ribbons and conductors is depicted in FIG. 9. That is, the tubing 210 has a comparatively thin and flexible wall 212, and a helical bead 214 protruding somewhat above this wall and extending helically about and along the length of the tubing. The tubing 210 also includes embedded conductors extending helically in the bead 214 and along the length of tubing 210 from end to end.

Continuing to viewing FIG. 9, both structures as well as steps in the process of making an inventive tubing 210 are illustrated. In FIG. 9 it is seen that the wall 212 is formed by successive helical wraps of an elongate thin thermoplastic primary ribbon 212' just as was the wall 12 of FIG. 2. It will be understood by the reader that FIG. 9 illustrates a condensed version of the successive manufacturing steps, which steps are shown successively in FIGS. 2 and 7. A primary ribbon 212' also includes a thin wall portion 212a, and a plateau portion 212b defining plural spaced apart grooves 218 each bounded by a respective rib part 220 of the plateau portion 212b. Disposed within these grooves 218 and separated from one another by the ribs 220 are individual conductors 222. A thin, elongate, secondary ribbon 224 is placed on top of the plateau 212b, and interbonds with this plateau 212b.

This secondary ribbon 224, is similar to the ribbon 24 of the first embodiment of FIGS. 1-6, but defines only a single elongate groove 226 bounded on each side by a respective rib part 228 of the secondary ribbon 224. As is seen in FIG. 9, disposed within this groove 226 of the secondary ribbon 224 is a twisted pair conductor set 230. In other words, the twisted pair conductor set 230 consists of a pair of individual insulated conductors twisted about one another and disposed in the groove 226. Such a twisted pair conductor set has unique advantages in terms of limiting capacitive and inductive couplings to adjacent conductors and to environmental electromagnetic interference sources. Thus, the twisted pair conductor 230 has unique advantages for instrumentation and telemetry uses of the tubing 210. As is described above (and which by now is familiar to the reader) the twisted pair conductor set 230 is also wrapped into the groove 226 as the progressively forming tubing 210 spins, which spinning is caused by the wrapping rolls described earlier.

FIG. 9 also shows that very shortly after the placement of the twisted pair conductor set 230 within recess 226 of the secondary ribbon 224, a bead portion 232 is extruded (i.e., molten plastic) and is disposed on top of the secondary ribbon 224 and twisted pair conductor set 230. As is by now well understood, the plastic components of the tubing 210 heat bond to one another as they touch, and form a unitary whole which is integral.

It will be understood that during and after formation of the tubings 10, 110, 210 as described above, the tubing is subjected to cooling, which may include a conduit disposed within the winding head and which sprays water directed radially outwardly against the inner surface of the tubing as it forms (i.e., water spray "W" described by reference to FIG. 1). Also, to the left (i.e., in the direction of axial movement of the forming tubing) of the manufacturing steps indicated in FIGS. 2, 7, and 9 (i.e., outside of the view of these Figures) is conventionally disposed a cooling trough containing water into which the tubing enters as it proceeds leftwardly (recalling the motion arrow on FIG. 2). The cooling water in this trough finishes cooling of the tubing product from its molten condition to a finished flexible plastic integral tubular product. Conventionally, the tubing is then cut into pre-selected lengths for storage or shipment in a box.

To recap the structures disclosed and described above, the resulting tubing 10, 110, 210 includes a thin flexible wall section (for example, formed by the portion 12a of ribbon 12' apart from the plateau portion 12b) extending between adjacent wraps of the bead 14, as is seen best in FIG. 1. This thin flexible wall portion provides for exceptional flexibility for the tubing, while the bead 14 provides support for the wall so that the tubing is kink and collapse-resistant. Also, the conductors disposed within the bead 14 are uniformly spaced apart as they extend helically along the tubing within the plateau portion 12b captured within the bead 14. This spacing apart of the conductors 16 provides a number of benefits. When a pair of the conductors are employed for electrical resistance heating, the heating is more dispersed than with conventional tubing. Similarly, the electrical properties of the conductors when used to convey electrical signals is favorable to this use. And, telemetry or instrumentation signals (i.e., light, fiber optic, or electrical) may be conducted along the conductors. Moreover, the spacing apart of these conductors ensures both improved insulation of the conductors from one another, an improved capacitance value between the conductors (and improved uniformity of this capacitance value), and reduced mutual inductive coupling among the conductors. Particularly with respect to the embodiment of FIG. 9, the twisted pair conductor set provides advantages for signal transmission which are well understood in the fields of telephony and telemetry. Finally, the inventive tubing product here disclosed provides unique advantages because of the dual-level disposition of the conductors at the bead of the tubing, and the resulting greater number of conductors which this new tubing structure and product can provide.

Figures 10, 11:
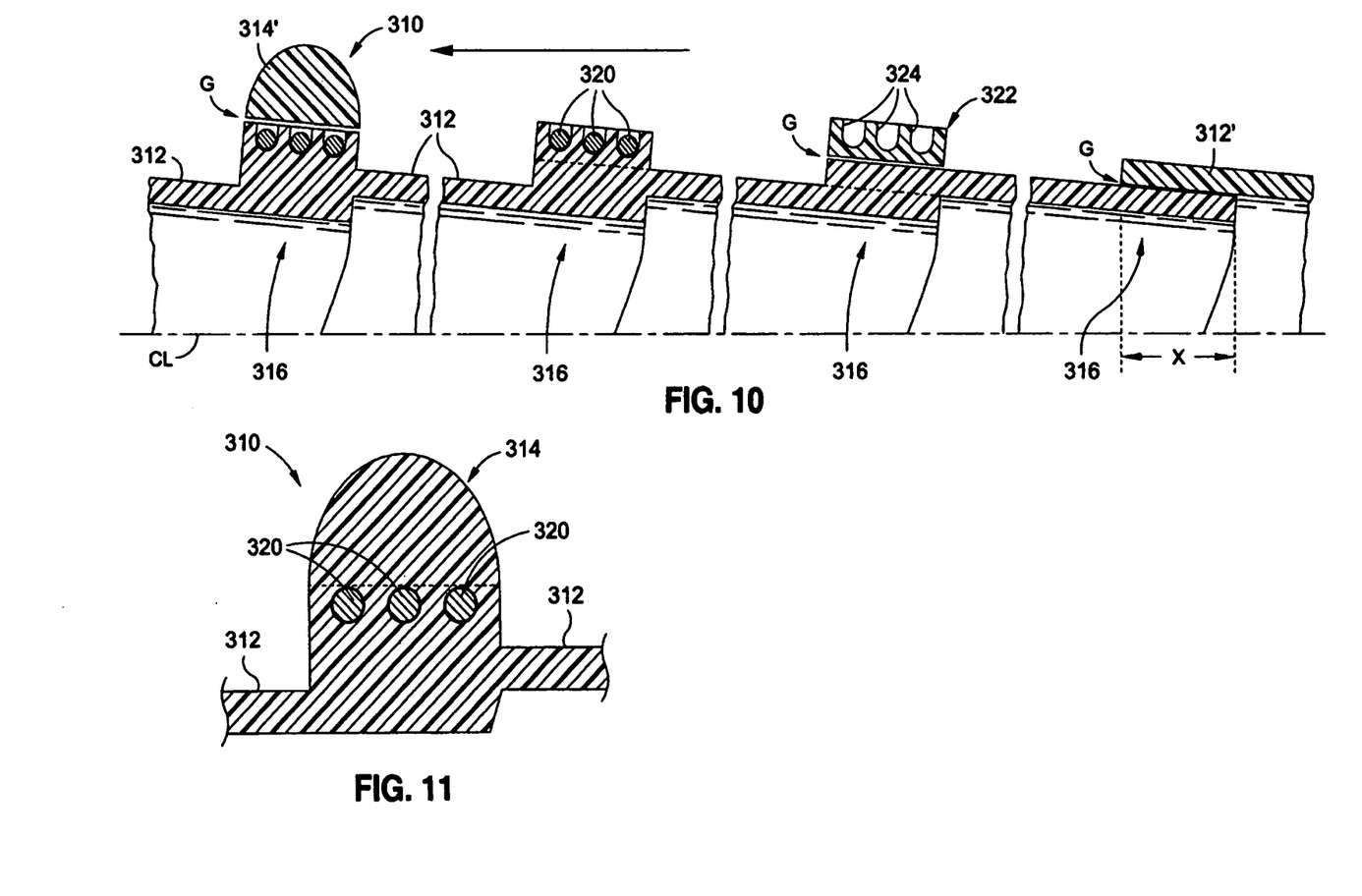
FIGS. 10 and 11 provide fragmentary cross sectional views of an elongate section of another alternative embodiment of tubing according to the present invention.

Considering now FIGS. 10 and 11 in conjunction with one another, and viewing first FIG. 10, it is seen that the making of yet another alternative embodiment of tubing 310 is depicted. Because this alternative embodiment of tubing 310 includes many features that are the same as, or which are analogous, in structure or function to, those of the first embodiment of FIGS. 1-6, these features are referenced by the same numeral used above, and, increased by three-hundred (300). The tubing 310 has an exterior appearance essentially the same as conventional tubing of this type, and the same as the tubing of FIGS. 1-6, as well as the tubing of FIGS. 7 through 9. That is, the tubing 310 has a comparatively thin and flexible wall 312, and a helical bead 314 protruding somewhat above this wall and extending helically about and along the length of the tubing. The tubing 310 also includes embedded conductors extending helically at the bead 314 and along the length of tubing 310 from end to end as is further explained below.

Viewing now FIG. 10, (which is much like FIG. 2) both structures as well as steps in the process of making an inventive tubing 310 are illustrated. It is seen in FIG. 10 that the wall 312 is formed by successive helical wraps of an elongate thin thermoplastic ribbon 312'. The first step of formation of the tubing wall is as was explained above for the embodiments described above. A lap joint 316 is formed by the overlapped and interbonded wraps of ribbon 312'.

At the next successive lap joint 316 to the left in FIG. 10 it is seen that a molten extruded plateau portion 322 is about to be applied to the tubular body formed by interbonded wraps of ribbon 312' (note the slight gap "G"). Again, the plateau portion 322 is another ribbon, like ribbon 312' but smaller and differing in details of structure. On its upper or radially outwardly disposed face, the plateau portion 322 defines three elongate and parallel grooves 324, which are sized to receive conductors 320. The conductors 320 are placed into the grooves 324 at the next successive lap joint 316 to the left, as illustrated in FIG. 10. The grooves 324 are effective to guide the conductors 320 with a high degree of precision to their desired locations on the plateau portion 322 of the tubing 310.

At the next lap joint 316 to the left on FIG. 10 (i.e., where placement of conductors 320 is indicated), the fact of interbonding of the plateau portion 322 with the tubular body of the tubing 310 is depicted. It is also to be noted that the plateau portion 322 will provide a base or foundation upon which the bead 314 of the tubing 310 will be received. That is, as is illustrated at the next lap joint 316 to the left in FIG. 10, very shortly after the placement of the conductors 320 within the grooves 324 a bead portion 314' is extruded (i.e., molten plastic) and is disposed on top of the plateau 322 and conductors 320 (note the slight gap "G" in FIG. 10). So the plateau portion 322 forms a base or foundation upon which the bead portion 314' secures. Together, the plateau portion 322 and bead portion 314' form the bead 314 seen on the outside of tubing 310 (which outwardly appears just like the tubing 610 seen in FIG. 1). The moment after touch down of the bead portion 314' atop of the plateau portion 322 is depicted in FIG. 11, illustrating that the plastic components of the tubing 310 heat bond with one another into a unitary whole, carrying the conductors 320.

Figure 12:
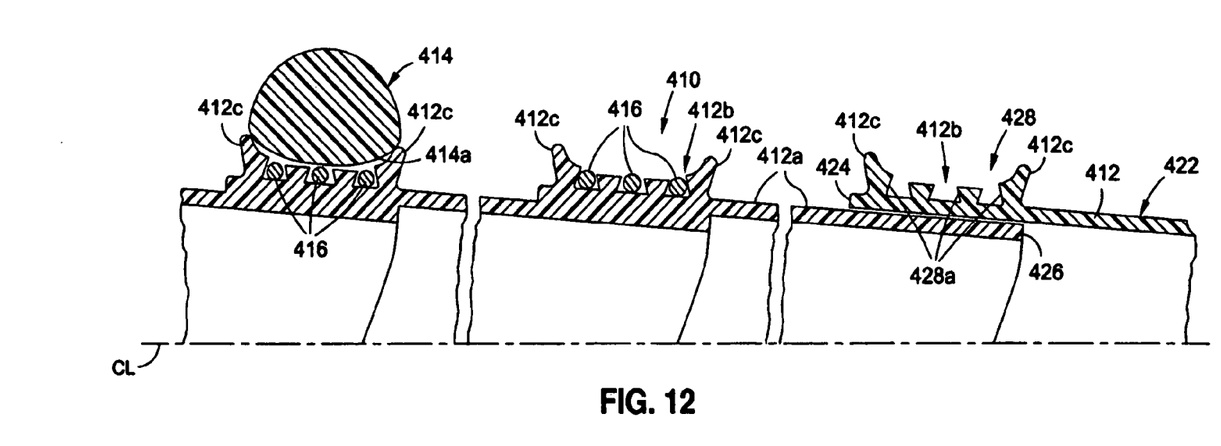
FIGS. 12 and 13 provide fragmentary cross sectional views of an elongate section of yet another alternative embodiment of tubing according to the present invention.
Figure 13:
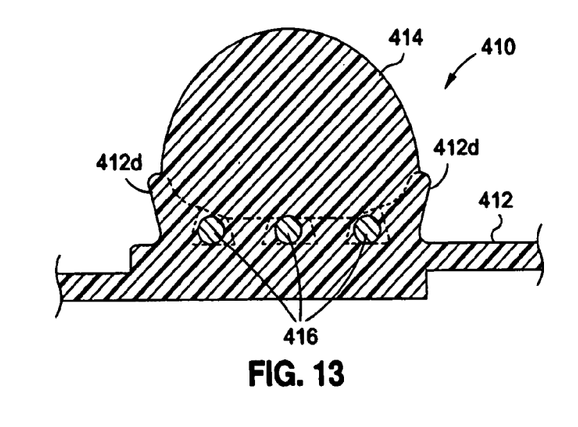

Viewing now FIGS. 12 and 13, another alternative embodiment of tubing product is illustrated, which has remarkable advantages during manufacturing. That, is, the tubing product of FIGS. 12 and 13 offers remarkably reduced manufacturing costs because it is very stable during manufacturing and has reduced scrap and operator-attention or time requirements compared to earlier conventional tubings of this type. Viewing FIGS. 12 and 13 in conjunction, it is seen that a tubing 410 with wall 412 includes a rather thin and flexible portion 412a extending between adjacent beads 414, and a somewhat thickened plateau portion 412b. That is, the plateau portion 412b protrudes radially outwardly. Further, the bead 414 resides atop of this plateau portion 412b so that the bead 414 is elevated at its base 414a radially outwardly of the wall 412 of the tubing.

Within the plateau portion the tubing includes plural spaced apart conductors 416. These conductors may be made of metal, so that they will conduct electricity. Alternatively, one or all of the conductors may be made of glass (i.e., a fiber optic conductor) so that it will conduct optical signals. Thus, the conductors 416 may be used for electrical resistance heating, for electrical signal conduction (i.e., for instrumentation or telemetry signals) or for optical signals.

In a method of making such a tubing according to this present invention (viewing now FIG. 12), a first extrudate in the form of a molten heat-bondable ribbon 422 is extruded having a leading edge 424 and trailing edge 426 and a thickened ribbed (or grooved) plateau portion 428 defining plural grooves 428a. Importantly, these grooves 428a are not of uniform width, and instead are in the embodiment of FIGS. 12 and 13, generally trapezoidal in cross sectional shape. Importantly, the grooves 428a converge toward their open, (radially-outer) extent, so that they are narrower in axial (i.e., along the length of the tubing) width toward their radially outer extent than they are at their radially inner extent. During placement of the conductors 416 the configuration of the grooves 428a assists in retaining the conductors in the grooves rather than allowing one or more of the conductors to migrate out of the groove in which it is intended to reside.

Further to the above, it is seen best in FIG. 12, that the plateau portion 412b includes a pair of spaced apart, divergent, radially outwardly extending lip portions 412c. These lips 412c in their as-extruded condition (i.e., Viewing FIG. 12) provides on the one hand an effective recess, or radially outwardly opening helical groove into which the bead 414 will be embraced. This groove or recess configuration provided by the divergent lips 412c assists in positioning the bead 414 in its desired location atop of the plateau 412b (viewing especially FIG. 12 at the left-hand end of this Figure). Still further, the divergent lips 412c are pressed downwardly as the bead 414 is seated atop of these lips and the plateau portion 412b. The result is that the lips 412c form a transitional surface 412d (seen in FIG. 13) between the body of tubing 410 and the bead portion 414. Because of the transition surface 412d, the possibility is avoided or minimized to have a recess or feature on the outside of tubing 410 which could trap and retain soil, filth, or contamination. Thus, the exterior surface of the tubing 410 is especially easy to clean.

It will be understood that during and after formation of the tubing constructions 10, etc., as described above, the tubing is subjected to cooling, which may include a conduit disposed within the winding head and which sprays water directed radially outwardly against the inner surface of the tubing as it forms (i.e., water spray "W" described by reference to FIG. 2 in particular). Also, to the left (i.e., in the direction of axial movement of the forming tubing) of the manufacturing steps indicated in FIGS. 2, 4, and 6 (i.e., outside of the view of these Figures) is conventionally disposed a cooling trough containing water into which the tubing enters as it proceeds leftwardly (recalling the motion arrow on FIG. 2). The cooling water in this trough finishes cooling of the tubing product from its molten condition to a finished flexible plastic integral tubular product. Conventionally, the tubing is then cut into pre-selected lengths for storage or shipment in a box.

The resulting tubing 10 (and 110, 210, 310 and 410 as well) includes a thin flexible wall (i.e., wall 12 for example) section extending between adjacent wraps of the bead 14, as is seen best in FIG. 1. This thin flexible wall portion provides for exceptional flexibility for the tubing, while the bead 14 provides support for the wall so that the tubing is kink and collapse-resistant. Also, the conductors disposed at the bead have desirable electrical properties when used to convey electrical signals. And may be used to provide resistance heating to the tubing as well. On the other hand, telemetry or instrumentation signals (i.e., light, fiber optic, or electrical signals) may be conducted along the conductors.

While exemplary forms or embodiments of the invention has been shown in the drawings and described herein, variations from these exemplary forms will be apparent to those skilled in the art. For example, a tubing providing only a twisted pair conductor set disposed within a bead of the tubing is clearly within the ambit of this invention. Similarly, a tubing having conductors disposed within a bead structure of the tubing and at differing radial levels relative to the center of the tubing is also part of this invention. The invention therefore should not be construed as limited to the specific forms shown and described, but instead as is set forth in the following claims, which provide a definition of the invention.

What is claimed is:

1. A thin-walled, flexible and collapse-resistant thermoplastic tubing having a substantially smooth bore and a helical outer support bead structure, the tubing including at least one conductor helically disposed within said support bead structure, said tubing comprising:
   a flexible tubing wall formed of an elongate thermoplastic ribbon while molten being helically wrapped repeatedly on itself to partially overlap successive wraps of said ribbon a certain amount forming a helical lap joint where successive wraps of said ribbon heat-bond integrally to one another so that an elongate tubular body is formed;
   a second elongate thermoplastic ribbon while molten being helically wrapped about said tubular body at said lap joint and heat-bonding integrally thereto forming a plateau portion, said second elongate thermoplastic ribbon defining at least one elongate fine-dimension groove;
   at least one elongate conductor set disposed in said elongate fine-dimension groove of said second elongate thermoplastic ribbon to be embedded within said plateau portion and helically around and along said elongate tubular body;
   an elongate thermoplastic support bead portion disposed helically around and along said elongate tubular body atop of said plateau portion and at least one conductor embedded therein, said support bead portion integrally heat-bonding to said second ribbon and tubular body so that said plateau portion and said support bead portion cooperatively form said bead structure, and said tubing comprises a unitary thin-walled tubing structure with helical outer support bead and embedded conductor extending helically about and along said tubing.

2. The tubing of claim 1, wherein said at least one conductor includes a twisted pair conductor set, in which a pair of conductors are insulated from one another and twisted about one another before being disposed in said elongate groove of said ribbon forming said tubular body.

3. The tubing of claim 1 wherein said at least one conductor includes a resistance heating conductor which is in heat transfer relation with fluid flow within said tubular body.

4. The tubing of claim 1 wherein said plateau portion defines a pair of grooves, and one of said pair of grooves receives a twisted pair conductor set, in which a pair of conductors are insulated from one another and twisted about one another before being disposed in said one of said pair of grooves of said ribbon forming said tubular body, and a second of said pair of grooves receives a single conductor.

5. A method for making a helically wound, seamless plastic tubing comprising, the method comprising:
   forming an elongate ribbon of molten thermoplastic having a thin portion and a thickened plateau portion including at least one elongate groove, helically wrapping said elongate ribbon so that said plateau portion overlaps a part of said thin portion to form a helical lap joint and simultaneously heat-bonding said ribbon to itself to form an elongate tubular body with said plateau portion extending radially outwardly on and helically along said tubular body;
   laying an elongate conductor helically around and along said tubular body within said at least one elongate groove of said plateau portion, wherein said conductor is formed as one of a twisted pair conductor set, with said twisted pair conductor set including at least a pair of conductors insulated from one another and twisted about one another;
   forming an elongate bead of thermoplastic material; and
   helically wrapping said bead about and along said tubular body atop said conductor and plateau portion, while simultaneously heat-bonding said bead integrally with said tubular body to form a unitary tubing including said ribbon and said bead with said conductor embedded therein.

6. The method of claim 5, wherein said at least one elongate groove defines at least one rib on said plateau portion.

7. The method of claim 6 further comprising providing for said plateau portion to define plural grooves in parallel of said at least one elongate groove, and for said at least one rib to bracket and separate individual ones of said plural grooves, and providing for said plural grooves and at least one rib to cooperatively guide plural conductors into repose within said plural grooves of said plateau portion.

8. The method of claim 7 wherein forming said plural grooves includes forming a larger groove for receiving a twisted pair conductor set, and forming a smaller groove for receiving a single conductor.

9. The method of claim 8 wherein forming said plural grooves includes forming at least a shallow groove as one of said plural grooves, forming a deeper groove as one of said plural grooves, and disposing in said deeper groove a resistance heating conductor, whereby said resistance heating conductor provides a high heat transfer coefficient to fluid flow within said tubular body.

10. A smooth-bore flexible tubing with helical outer support bead, said tubing comprising:
    an elongate thermoplastic ribbon helically wrapped and partially overlapped onto, itself and mutually heat bonded to itself to form a flexible tubular body, said thermoplastic ribbon including an elongate fine-dimension portion and a comparatively thickened elongate plateau portion extending radially outwardly and helically about and along said flexible tubing;
    plural conductors disposed helically about and along said flexible tubing at said plateau portion;
    at least a pair of said plural conductors being configured as a twisted pair conductor set; and
    an elongate thermoplastic support bead disposed helically around and along said tubing atop of said plateau portion and said twisted pair conductor set, said support bead integrally heat-bonding to said tubular body to form a unitary thin-walled tubing structure with helical outer support bead and embedded conductors, whereby said embedded conductors are configured to include a twisted pair conductor set providing reduced coupling to sources of electro-magnetic interference.

11. The tubing of claim 10 wherein said tubular body further includes a resistance heating conductor for providing resistance heating to fluid flowing within said tubular body.

12. A thin-walled, flexible and collapse-resistant thermoplastic tubing having a substantially smooth bore and a helical outer support bead structure, the tubing including at least one conductor helically disposed within said support bead structure, said tubing comprising:
    a flexible tubing wall formed of an elongate thermoplastic ribbon including a comparatively thinner wall portion and a comparatively thicker bead-foundation plateau portion, said plateau portion defining at least one elongate fine-dimension groove converging in a radially outward direction to open radially on said plateau portion, said ribbon while molten being helically wrapped repeatedly on itself to overlap a certain amount forming a helical lap joint where successive wraps of said ribbon heat-bond integrally to one another so that an elongate tubular body is formed;

at least one elongate conductor disposed in one or more fine-dimension grooves of said plateau portion and helically around and along said elongate tubular body; and an elongate thermoplastic support bead portion disposed helically around and along said elongate tubular body atop of said plateau portion, said support bead portion integrally heat-bonding to said ribbon so that said plateau portion and said support bead portion cooperatively form said bead structure, and said tubing comprises a unitary thin-walled tubing structure with helical outer support bead and at least one embedded conductor extending helically about and along said tubing.

13. The tubing of claim 12 wherein said at least one conductor includes at least one resistance conductor for providing resistance heating to said tubing.

14. The tubing of claim 12 wherein said at least one conductor includes at least one instrumentation conductor for conducting an instrumentation signal along a length of said tubing.

15. The tubing of claim 12 wherein said at least one conductor includes at least a twisted pair set of instrumentation conductors for conducting an instrumentation signal along a length of said tubing.

16. The tubing of claim 12 further comprising a secondary ribbon interposed between said ribbon and said bead portion, said secondary ribbon defining at least one elongate groove extending helically about and along said tubing, and at least one conductor disposed within said at least one elongate groove of said secondary ribbon at a radially outwardly spaced location relative to said at least one conductor disposed within said plateau portion.

17. The tubing of claim 16 wherein said secondary ribbon is free of elongate grooves when placed upon said plateau portion, and said secondary ribbon responding to a difference in radial compliance of said tubing structure over said at least one conductor at said plateau to form at least one corresponding elongate recess of said secondary ribbon, and one or more conductors disposed in said at least one elongate recess to extend helically about and along said tubing.

18. The tubing of claim 12, wherein said plateau portion further includes a pair of axially spaced apart divergent lip portions bracketing said plural fine-dimension grooves.

19. A method for making a helically wound, seamless plastic tubing, the method comprising:

forming an elongate ribbon of molten thermoplastic having a thin portion and a thickened plateau portion including at least one elongate groove, forming said at least one elongate groove to converge radially outwardly so as to guide and trap a conductor received therein, helically wrapping said elongate ribbon so that said plateau portion overlaps a part of said thin portion to form a helical lap joint and simultaneously heat-bonding said ribbon to itself to form an elongate tubular body with said plateau portion extending radially outwardly on and helically along said tubular body;

laying at least one elongate conductor helically around and along said tubular body within said at least one elongate groove of said plateau portion;

forming an elongate bead of thermoplastic material; and helically wrapping said bead about and along said tubular body atop said at least one conductor and plateau portion while heat-bonding said bead integrally with said tubular body to form a unitary tubing including said ribbon and said bead with said at least one conductor embedded therein.

20. The method of claim 19 further comprising forming an elongate secondary ribbon, and interposing said secondary ribbon between said tubular body and said bead portion, and forming at least one elongate groove extending along said secondary ribbon for receiving at least one respective conductor.

21. The method of claim 20 wherein said secondary ribbon is free of elongate grooves when placed upon said plateau portion and said at least one elongate groove extending along said secondary ribbon is formed by said secondary ribbon responding to a difference in radial compliance of said tubing structure over said at least one conductor at said plateau to form at least one corresponding elongate recess of said secondary ribbon, and wherein the method further comprises disposing one or more conductors in said at least one elongate recess to extend helically about and along said tubing.

22. The method of claim 19, wherein forming an elongate ribbon of molten thermoplastic further includes providing said plateau portion with a pair of radially outwardly extending and radially divergent lip portions bracketing said at least one elongate groove.

23. A thin-walled, flexible and collapse-resistant thermoplastic tubing having a substantially smooth bore and a helical outer support bead structure, the tubing including at least one conductor helically disposed within said support bead structure, said tubing comprising:

a flexible tubing wall formed of an elongate thermoplastic ribbon including a comparatively thinner wall portion and a comparatively thicker bead-foundation plateau portion, said plateau portion defining at least one elongate fine-dimension groove, said ribbon while molten being helically wrapped repeatedly on itself to overlap a certain amount forming a helical lap joint where successive wraps of said ribbon heat-bond integrally to one another so that an elongate tubular body is formed;

at least one elongate conductor disposed in one or more fine-dimension grooves of said plateau portion and helically around and along said elongate tubular body;

a secondary ribbon disposed helically around and along said elongate tubular body atop of said plateau portion, said secondary ribbon defining at least one elongate groove extending helically about and along said tubing, and at least one conductor disposed within said at least one elongate groove of said secondary ribbon at a radially outwardly spaced location relative to said at least one conductor disposed within said plateau portion; and an elongate thermoplastic support bead portion disposed helically around and along said elongate tubular body atop of said secondary ribbon, said support bead portion integrally heat-bonding to said ribbon so that said plateau portion, said secondary ribbon, and said support bead portion cooperatively form said bead structure, and said tubing comprises a unitary thin-walled tubing structure with helical outer support bead and at least one embedded conductor extending helically about and along said tubing.

24. The tubing of claim 23, wherein said secondary ribbon is free of elongate grooves when placed upon said plateau portion, and said secondary ribbon responding to a difference in radial compliance of said tubing structure over said at least one conductor at said plateau to form at least one corresponding elongate recess of said secondary ribbon, and one or more conductors disposed in said at least one elongate recess to extend helically about and along said tubing.

25. A method for making a helically wound, seamless plastic tubing, the method comprising:

forming an elongate ribbon of molten thermoplastic having a thin portion and a thickened plateau portion including at least one elongate groove, helically wrapping said elongate ribbon so that said plateau portion overlaps a part of said thin portion to form a helical lap joint and simultaneously heat-bonding said ribbon to itself to form an elongate tubular body with said plateau portion extending radially outwardly on and helically along said tubular body;

laying at least one elongate conductor helically around and along said tubular body within said at least one elongate groove of said plateau portion;

forming an elongate secondary ribbon, and disposing said secondary ribbon helically around and along said elongate tubular body atop of said plateau portion, and forming at least one elongate groove extending along said secondary ribbon for receiving at least one respective conductor;

laying at least one conductor within said at least one elongate groove of said secondary ribbon at a radially outwardly spaced location relative to said at least one conductor disposed within said plateau portion;

forming an elongate bead of thermoplastic material; and helically wrapping said bead about and along said tubular body atop said secondary ribbon while heat-bonding said bead integrally with said tubular body to form a unitary tubing including said ribbon, said secondary ribbon, and said bead with said at least one conductor embedded therein.

26. The method of claim 25 wherein said secondary ribbon is free of elongate grooves when placed upon said plateau portion and said at least one elongate groove extending along said secondary ribbon is formed by said secondary ribbon responding to a difference in radial compliance of said tubing structure over said at least one conductor at said plateau to form at least one corresponding elongate recess of said secondary ribbon.

27. A thin-walled, flexible and collapse-resistant thermoplastic tubing having a substantially smooth bore and a helical outer support bead structure, the tubing including at least one conductor helically disposed within said support bead structure, said tubing comprising:

a flexible tubing wall formed of an elongate thermoplastic ribbon including a comparatively thinner wall portion and a comparatively thicker bead-foundation plateau portion, said plateau portion defining at least one elongate fine-dimension groove, and said plateau portion further including a pair of axially spaced apart divergent lip portions bracketing said at least one fine-dimension groove, said ribbon while molten being helically wrapped repeatedly on itself to overlap a certain amount forming a helical lap joint where successive wraps of said ribbon heat-bond integrally to one another so that an elongate tubular body is formed;

at least one elongate conductor disposed in one or more fine-dimension grooves of said plateau portion and helically around and along said elongate tubular body; and an elongate thermoplastic support bead portion disposed helically around and along said elongate tubular body atop of said plateau portion and between said pair of divergent lip portions, said support bead portion integrally heat-bonding to said ribbon so that said plateau portion and said support bead portion cooperatively form said bead structure, and said tubing comprises a unitary thin-walled tubing structure with helical outer support bead and at least one embedded conductor extending helically about and along said tubing.

28. A method for making a helically wound, seamless plastic tubing, the method comprising:

forming an elongate ribbon of molten thermoplastic having a thin portion and a thickened plateau portion including at least one elongate groove, helically wrapping said elongate ribbon so that said plateau portion overlaps a part of said thin portion to form a helical lap joint and simultaneously heat-bonding said ribbon to itself to form an elongate tubular body with said plateau portion extending radially outwardly on and helically along said tubular body, providing said plateau portion with a pair of radially outwardly extending and radially divergent lip portions bracketing said at least one elongate groove;

laying at least one elongate conductor helically around and along said tubular body within said at least one elongate groove of said plateau portion;

forming an elongate bead of thermoplastic material; and helically wrapping said bead about and along said tubular body atop said at least one conductor and plateau portion and utilizing said divergent lip portions to guide said bead portion and also to form a transition surface between said bead portion and said tubular body, while heat-bonding said bead integrally with said tubular body to form a unitary tubing including said ribbon and said bead with said at least one conductor embedded therein.

* * * * *